(12) United States Patent
Fukuzawa (10) Patent No.: US 8,240,712 B2
(45) Date of Patent: Aug. 14, 2012

(54) SHOULDER ANCHOR DEVICE

(75) Inventor: Masaki Fukuzawa, Okazaki Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 200 days.

(21) Appl. No.: 12/602,512

(22) PCT Filed: May 28, 2008

(86) PCT No.: PCT/JP2008/060236
§ 371 (c)(1),
(2), (4) Date: Dec. 1, 2009

(87) PCT Pub. No.: WO2008/149866
PCT Pub. Date: Dec. 11, 2008

(65) Prior Publication Data
US 2010/0181750 A1    Jul. 22, 2010

(30) Foreign Application Priority Data
Jun. 1, 2007    (JP) ................................ 2007-147121

(51) Int. Cl.
*B60R 22/00* (2006.01)
(52) U.S. Cl. ...................................................... 280/808
(58) Field of Classification Search .............. 280/801.1, 280/801.2, 808; 297/483, 486
See application file for complete search history.

(56) References Cited

U.S. PATENT DOCUMENTS

| | | | | |
|---|---|---|---|---|
| 4,560,204 A | * | 12/1985 | Zeumer et al. | 297/483 |
| 4,861,070 A | * | 8/1989 | Boag | 280/808 |
| 5,655,793 A | * | 8/1997 | Isonaga | 280/801.2 |
| 6,276,720 B1 | | 8/2001 | Saito et al. | |
| 7,198,300 B2 | * | 4/2007 | Daume et al. | 280/801.2 |
| 7,232,154 B2 | * | 6/2007 | Desmarais et al. | 280/801.2 |
| 7,331,609 B2 | * | 2/2008 | Uno et al. | 280/801.2 |

FOREIGN PATENT DOCUMENTS

| | | |
|---|---|---|
| DE | 102004038392 A1 | 3/2006 |
| JP | 08276818 A  * | 10/1996 |
| JP | 08276818 A | 10/1996 |
| JP | 2000168497 A | 6/2000 |
| JP | 2001080460 A | 3/2001 |
| JP | 2004330992 A  * | 11/2004 |
| JP | 2004330992 A | 11/2004 |

* cited by examiner

Primary Examiner — Joseph Rocca
Assistant Examiner — Robert A Coker
(74) Attorney, Agent, or Firm — Gifford, Krass, Sprinkle, Anderson & Citkowski, P.C.

(57) ABSTRACT

A shoulder anchor device is provided with a shoulder anchor (38) in which is formed an insert-through hole (40) through which a webbing (24) is inserted, and a slide plate (50) covering a vehicle cabin interior side of the shoulder anchor. A gap between an upper edge portion (52a) of an opening portion (52) at the slide plate (50) and a supporting region (42) that supports the webbing (24) at the shoulder anchor, is such that A>B where A is a gap dimension at a front portion side in a vehicle longitudinal direction and B is a gap dimension at a rear portion side in the vehicle longitudinal direction. A rear portion (152a) in the vehicle longitudinal direction at the upper edge portion (52a) is formed at a position at which, when the webbing (24) is twisted, the rear portion (152a) abuts a twisted portion of the webbing and correction of the twisted portion is possible. At a time of taking-up the webbing, twisting of the webbing which passes through the shoulder anchor insert-through hole can be prevented or suppressed, and pulling-out of the webbing can be made to be smooth.

8 Claims, 6 Drawing Sheets

FIG. 6 and, at the rear portion in the vehicle longitudinal direction at the upper edge portion, the bottom surface of the extended portion protrudes toward the vehicle bottom side.

SHOULDER ANCHOR DEVICE

CROSS-REFERENCE TO RELATED APPLICATIONS

This application is the U.S. national phase of PCT/JP2008/060236 filed May 28, 2008, which claims priority of Japanese Patent Application No. 2007-147121 filed Jun. 1, 2007.

TECHNICAL FIELD

The present invention relates to a shoulder anchor device that supports an intermediate portion of a webbing that is inserted through.

BACKGROUND TECHNOLOGY

In seat belt devices, the webbing supporting portion of a shoulder anchor which slidably supports a webbing is disposed at the upper portion of a pillar for example (see, for example, Japanese Patent Application Laid-Open (JP-A) No. 2001-80460). In such a device, at the time of taking-up the webbing, in order to prevent twisting of the webbing which passes through an insert-through hole of the shoulder anchor, the lower edge of a cover, which covers the vehicle cabin interior side of the webbing supporting portion, extends out, and a gap which is substantially equal to the thickness of the webbing is set between the lower edge of the cover and the webbing supporting portion, and this gap is made to be a gap for inserting the webbing through.

However, in this conventional structure, at times of pulling-out the webbing substantially toward the front side of the vehicle, the webbing interferes with the lower edge of the cover, and there are cases in which pulling-out of the webbing cannot be carried out smoothly.

DISCLOSURE OF THE INVENTION

In view of the above-described circumstances, a subject of the present invention is to provide a shoulder anchor device in which, at times of taking-up a webbing, twisting of the webbing which passes through a shoulder anchor insert-through hole can be prevented or suppressed, and in which pulling-out of the webbing can be made to be smooth.

A shoulder anchor device of a first aspect of the present invention includes: a shoulder anchor disposed at a vehicle side portion so as to be able to rotate around an axis that runs substantially along a vehicle transverse direction, and in which an insert-through hole is formed, a longitudinal direction intermediate portion of an elongated, belt-shaped webbing being inserted-through the insert-through hole and folded-back and supported; and a cover member disposed at the vehicle side portion so as to be unable to rotate, and covering a vehicle cabin interior side of the shoulder anchor, an opening portion for passage of the webbing being formed in the cover member along a locus of rotation of the insert-through hole due to rotation of the shoulder anchor, wherein a gap between an upper edge portion of the opening portion and a supporting region that supports the webbing at the shoulder anchor, is such that A>B, where that A is a gap dimension of a front portion side in a vehicle longitudinal direction and B is a gap dimension of a rear portion side, and a rear portion in the vehicle longitudinal direction at the upper edge portion is set at a position at which, when the webbing is twisted, the rear portion in the vehicle longitudinal direction at the upper edge portion abuts a twisted portion of the webbing and correction of the twisted portion is possible.

In accordance with the shoulder anchor device of the above-described aspect, the shoulder anchor is disposed at a vehicle side portion so as to be able to rotate around an axis that runs substantially along a vehicle transverse direction, and an insert-through hole is formed therein. A longitudinal direction intermediate portion of an elongated, belt-shaped webbing is inserted-through the insert-through hole, and is folded-back and supported. Therefore, at times of taking-up and times of pulling-out the webbing and the like, the shoulder anchor rotates in accordance with the direction in which the webbing is pulled. Further, the cover member is disposed at the vehicle side portion so as to be unable to rotate, and covers a vehicle cabin interior side of the shoulder anchor. An opening portion for passage of the webbing is formed in the cover member along the locus of rotation of the insert-through hole due to rotation of the shoulder anchor. Therefore, even if the webbing is pulled and the shoulder anchor rotates, the webbing passes through the opening portion of the cover member further toward the vehicle cabin interior side than the insert-through hole of the shoulder anchor.

When the webbing is pulled toward the vehicle front side by the vehicle occupant at the time of pulling-out the webbing, the shoulder anchor rotates toward the vehicle front side around the axis, and the webbing passes through the front portion in the vehicle longitudinal direction of the opening portion. Here, the gap between the upper edge portion of the opening portion and the supporting region that supports the webbing at the shoulder anchor, is set such that A>B, where A is the gap dimension at the front portion side in the vehicle longitudinal direction and B is the gap dimension at the rear portion side. Therefore, it is difficult for the webbing at the time of pulling-out, which is pulled toward the vehicle front side, to interfere with the upper edge portion of the opening portion, and the webbing is pulled-out smoothly.

When the webbing is pulled toward the vehicle bottom side at the time the webbing is taken-up, the shoulder anchor rotates around the axis toward the vehicle bottom side (returns to the original position), and the webbing passes through the rear portion in the vehicle longitudinal direction of the opening portion. Here, the rear portion in the vehicle longitudinal direction at the upper edge portion is set at a position at which, when the webbing is twisted, the rear portion abuts the twisted portion of the webbing and correction of the twisted portion is possible. The webbing at the time of taking-up abuts the rear portion at the upper edge portion of the opening portion and the twisted portion is corrected, and thereafter, the webbing passes through the insert-through hole and is taken-up.

Note that the gap at the front portion side in the vehicle longitudinal direction includes a region where at least a front end portion in the vehicle longitudinal direction of the webbing passes at a time of pulling-out the webbing, and the gap at the rear portion side in the vehicle longitudinal direction includes a region where at least a rear end portion in the vehicle longitudinal direction of the webbing passes at a time of rewinding the webbing.

The shoulder anchor device of the first aspect of the present invention may be structured such that the upper edge portion of the opening portion is provided with an extended portion which is extended toward a vehicle transverse direction outer side, and, at the rear portion in the vehicle longitudinal direction at the upper edge portion, a bottom surface of the extended portion protrudes toward a vehicle bottom side.

In accordance with the shoulder anchor device of the above-described structure, the upper edge portion of the opening portion is provided with the extended portion which is extended toward the vehicle transverse direction outer side, and, at the rear portion in the vehicle longitudinal direction at the upper edge portion, the bottom surface of the extended portion protrudes toward the vehicle bottom side. Therefore, at times of taking-up the webbing, the webbing is guided to the insert-through hole while the twisted portion is corrected by the extended portion, and the webbing passes through the insert-through hole and is taken-up.

In accordance with the above-described structure, there is the excellent effect that, at times of taking-up the webbing, twisting of the webbing while the webbing is guided to the insert-though hole can be prevented or suppressed.

In the shoulder anchor device of the first aspect of the present invention, the rear portion in the vehicle longitudinal direction at the upper edge portion of the opening portion may be set at a position that is further toward a vehicle cabin interior side than a peak portion which is an uppermost region of the supporting region at the shoulder anchor.

In accordance with the shoulder anchor device of the above-described structure, the rear portion in the vehicle longitudinal direction at the upper edge portion of the opening portion is set at a position which is further toward the vehicle cabin interior side than the peak portion which is the uppermost region of the supporting region at the shoulder anchor. Therefore, at times of taking-up the webbing, before the webbing is folded-back at the peak portion of the shoulder anchor, the webbing abuts the rear portion at the upper edge portion of the opening portion and the twisted portion is corrected, and thereafter, the webbing is folded-back at the peak portion and passes through the insert-through hole and is taken-up.

In accordance with the shoulder anchor device of the above-described structure, there is the excellent effect that, at times of taking-up the webbing, the twisted portion can be corrected before twisting of the webbing becomes great.

As described above, in accordance with the shoulder anchor device relating to the present invention, there are the excellent effects that, at times of taking-up the webbing, twisting of the webbing which passes through the insert-through hole of the shoulder anchor can be prevented or suppressed, and that the pulling-out of the webbing can be made to be smooth.

BEST MODE FOR CARRYING OUT THE INVENTION (Structure of the Embodiment)

An embodiment of a shoulder anchor device relating to the present invention will be described by using FIG. 1 through FIG. 6. Note that, arrow FR shown appropriately in these drawings indicates the forward side of the vehicle, arrow UP indicates the upward side of the vehicle, and arrow IN indicates the inward side in the vehicle transverse direction.

Figure 1:
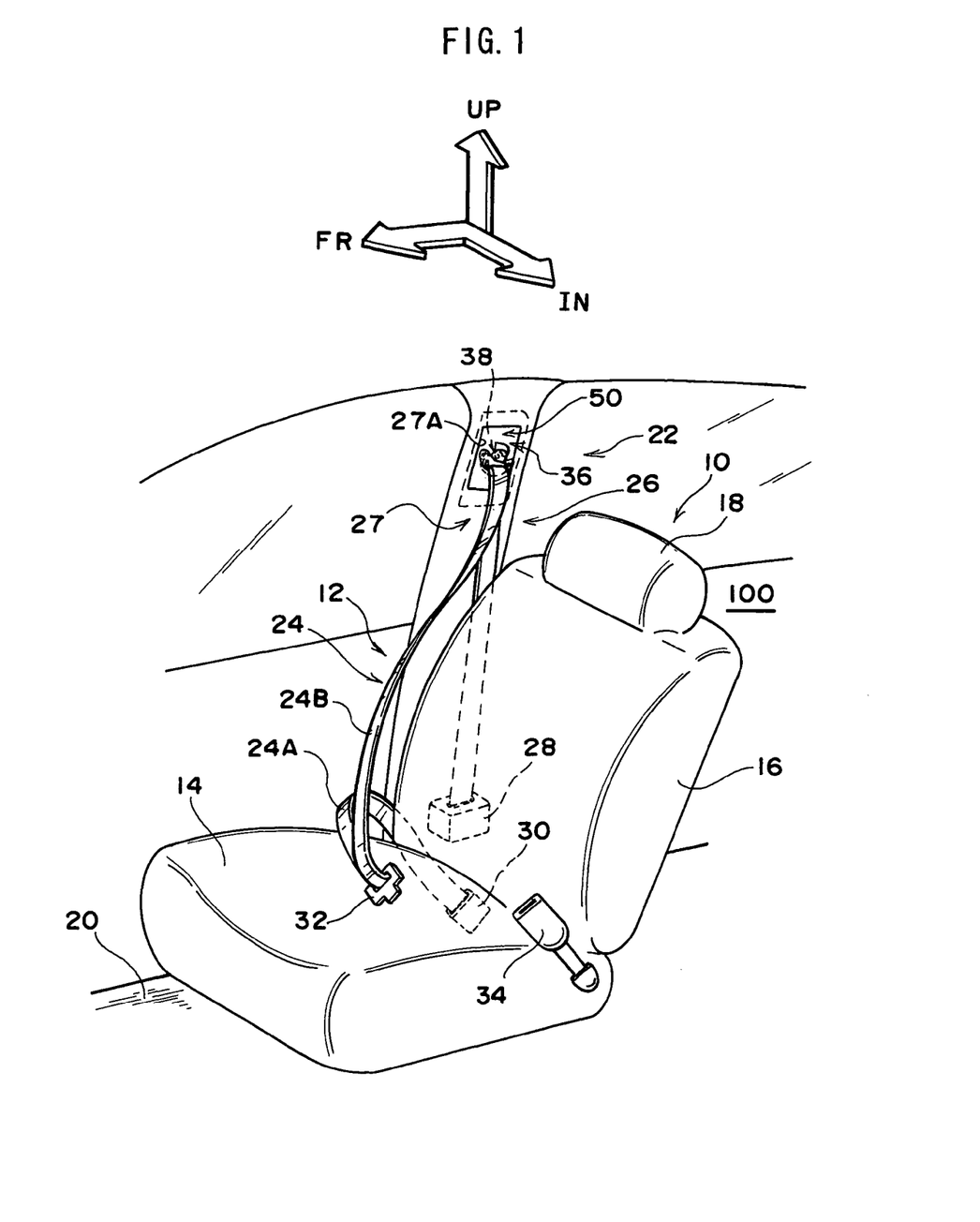
FIG. 1 is a perspective view showing the overall structure of a seat belt device equipped with a shoulder anchor device relating to an embodiment of the present invention.

A three-point seat belt device 12 for a vehicle occupant seated in a front seat 10 is depicted in a perspective view in FIG. 1. As shown in this drawing, the front seat 10 which is a seat for a vehicle is structured to include a seat cushion 14 upon which a vehicle occupant sits, a seat back 16 which is tiltably provided at the rear end portion of the seat cushion 14 and becomes a backrest for the vehicle occupant, and a head rest 18 which is provided at the top end portion of the seat back 16 such that its height is adjustable and which supports the head portion of the vehicle occupant.

The three-point seat belt device 12 which serves as a vehicle occupant protecting device is disposed at the front seat 10. The seat belt device 12 is equipped with an elongated, belt-shaped webbing 24 for restraining a vehicle occupant. One end portion of the webbing 24 is anchored to a spool of a webbing take-up device (retractor) 28 that is disposed in a vicinity of the lower end portion of a center pillar 26. Further, the other end portion of the webbing 24 is anchored to an anchor plate 30 which is fixed to a vehicle floor 20.

The intermediate portion of the webbing 24 is supported by a shoulder anchor (slip joint) 38 of a shoulder anchor device 36 which is provided at the upper portion of the center pillar 26 at a vehicle side portion 22, such that the intermediate portion of the webbing 24 is freely inserted through the shoulder anchor 38. Further, the intermediate portion of the webbing 24 (between the shoulder anchor 38 and the anchor plate 30) is inserted through a tongue plate 32 which is a high-strength member. The tongue plate 32 can be engaged with and separated from a buckle device 34 which is disposed in an upright state at the side of the seat cushion 14. By engaging the tongue plate 32 with the buckle device 34, the vehicle occupant can bring about an applied state of the three-point seat belt device 12, in which the portion from the anchor plate 30 to the tongue plate 32 is a lap side webbing 24A, and the portion from the tongue plate 32 to the shoulder anchor 38 is a shoulder side webbing 24B.

The height of the shoulder anchor 38 of the shoulder anchor device 36, which is provided at the upper portion of the center pillar 26, is adjustable so that the shoulder side webbing 24B can suit the physique of the vehicle occupant. A vehicle cabin interior 100 side of the center pillar 26 is covered by a pillar garnish (center pillar garnish) 27 which, in the broad sense, can be interpreted as an interior trim member for a vehicle. The pillar garnish 27 is curved in a convex shape (a substantial U-shape as seen in horizontal cross-section) toward the vehicle cabin interior 100 side, and extends substantially in the vertical direction of the vehicle. An opening 27A is formed in the upper portion, in the vertical direction of the vehicle, of the pillar garnish 27. The shoulder anchor device 36, which is disposed within the pillar garnish 27, exposes a slide plate 50 serving as a cover member from this opening 27A.

Figure 2:
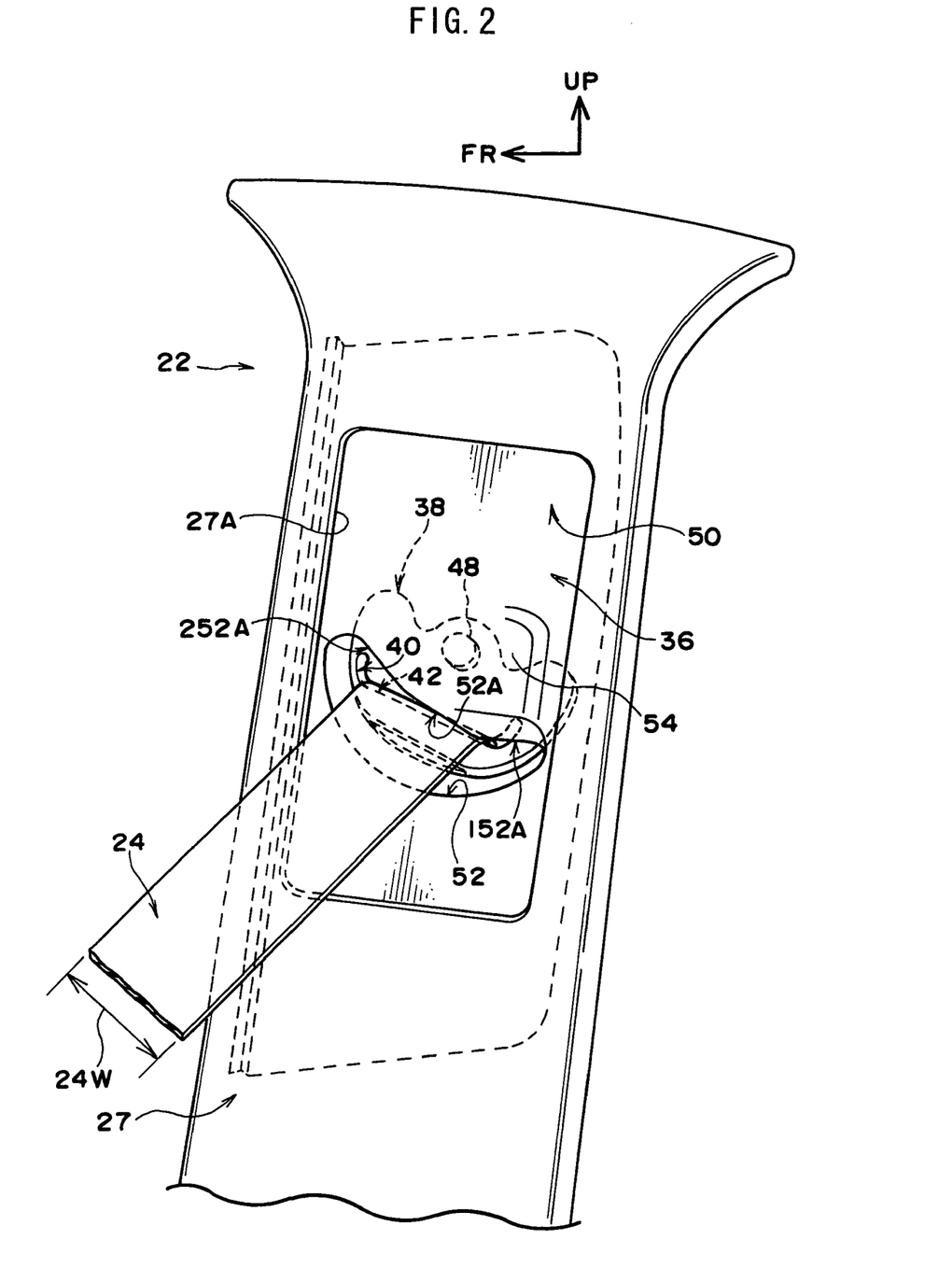
FIG. 2 is a perspective view showing the shoulder anchor device relating to the embodiment of the present invention in a state of being viewed from a vehicle cabin interior side.

The slide plate 50 functions as an adjuster for height adjustment, and can slide (move) in the vertical direction of the vehicle along a guide member (not shown) which extends in the vertical direction of the vehicle within the pillar garnish 27. The position of the slide plate 50 is maintained and the maintaining of the position of the slide plate 50 is released by predetermined operation of an operating portion (not shown). As shown in FIG. 2, the slide plate 50 is a plate member whose longitudinal direction is the vertical direction of the vehicle, and in which is formed an opening portion 52 which passes-through in the vehicle transverse direction and is for passage of the webbing 24. The slide plate 50 is disposed so as to be unable to rotate within the pillar garnish 27 at the vehicle side portion 22, and covers the vehicle cabin interior 100 (see FIG. 3) side of the shoulder anchor 38.

Figure 3:
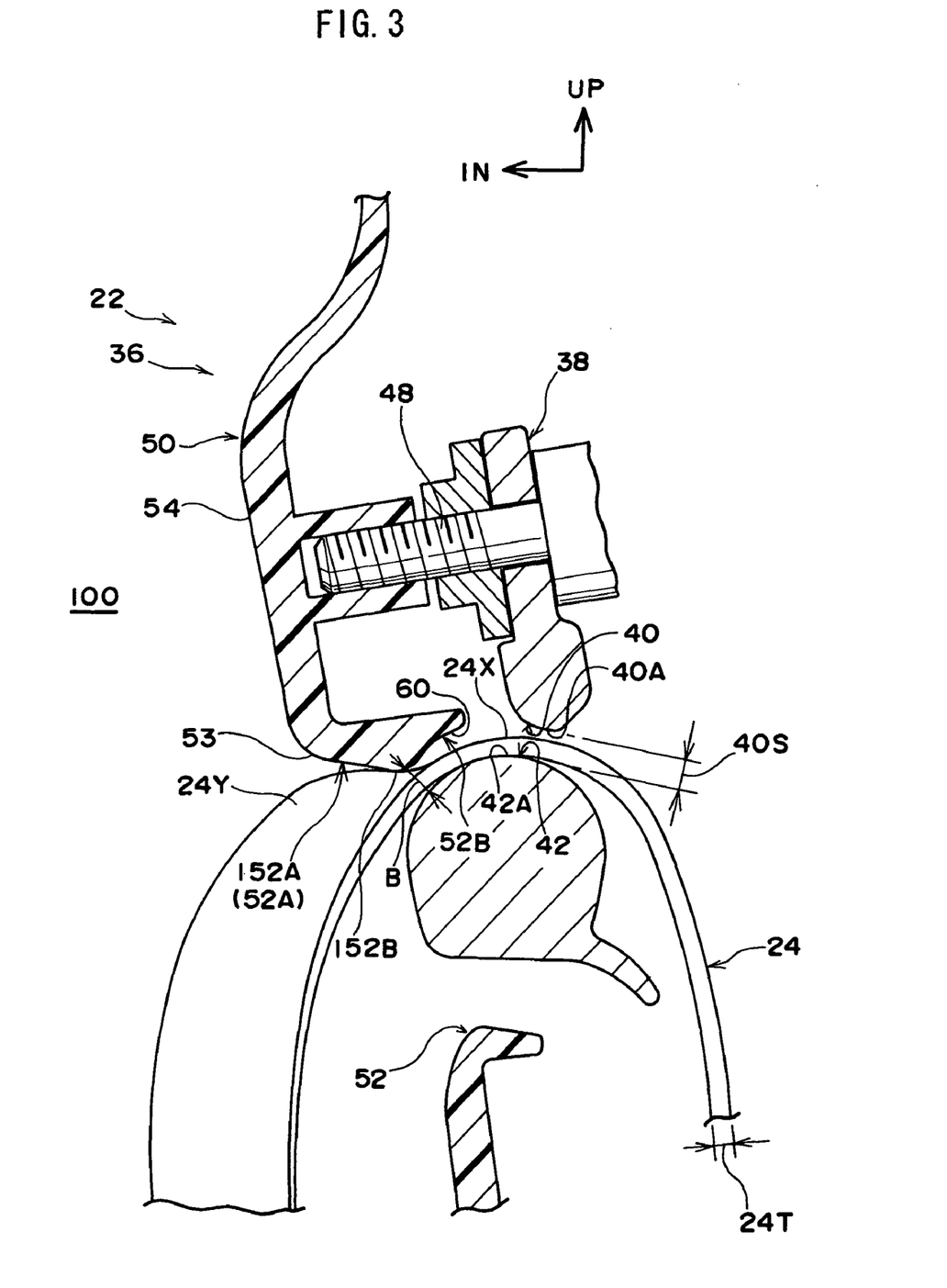
FIG. 3 is a cross-sectional view showing the shoulder anchor device relating to the embodiment of the present invention in a state of being cut at a rear portion in a vehicle longitudinal direction (corresponding to the cross-section of line 3-3 of FIG. 6).

The shoulder anchor 38 is mounted to the slide plate 50 by a bolt 48. The shoulder anchor 38 is thereby disposed so as to be able to rotate around the axis of the bolt 48 which runs substantially in the vehicle transverse direction at the vehicle side portion 22. Further, an insert-through hole 40 is formed in the shoulder anchor 38 at a portion beneath the portion mounted by the bolt 48. As shown in FIG. 3, the longitudinal direction intermediate portion of the elongated, belt-shaped webbing 24 is inserted-through the insert-through hole 40, and the webbing 24 is folded-back and is supported at a supporting region 42 of the shoulder anchor 38.

As shown in FIG. 2, the insert-through hole 40 is a long hole whose intermediate portion is rectilinear. The longitudinal direction dimension of the insert-through hole 40 is set to be longer than a width dimension 24W (e.g., 47 mm) of the webbing 24, and both sides of the insert-through hole 40 are bent in the shapes of hooks toward the shoulder anchor upper side. Further, a hole gap dimension 40S of the insert-through hole 40 shown in FIG. 3 (the height dimension of the opening which is perpendicular to the longitudinal direction) is set to a dimension which is slightly larger than a thickness dimension 24T (e.g., 1.2 mm) of the webbing 24, and, from the standpoint of preventing reversing of the webbing 24, a dimension (e.g., 2.0 mm to 2.2 mm) which is less than twice the thickness dimension 24T of the webbing 24. The supporting region 42 of the shoulder anchor 38, which supports the webbing 24 such that the webbing 24 slides freely, is formed in a substantial semicircular shape as seen in side section, and extends (see FIG. 2) such that the longitudinal direction thereof is a direction substantially orthogonal to the cross-section shown in FIG. 3. A peak portion 42A, which is the uppermost region of the supporting region 42, is disposed so as to be offset toward the vehicle cabin interior 100 side from a hole upper edge 40A of the insert-through hole 40.

Figure 4:
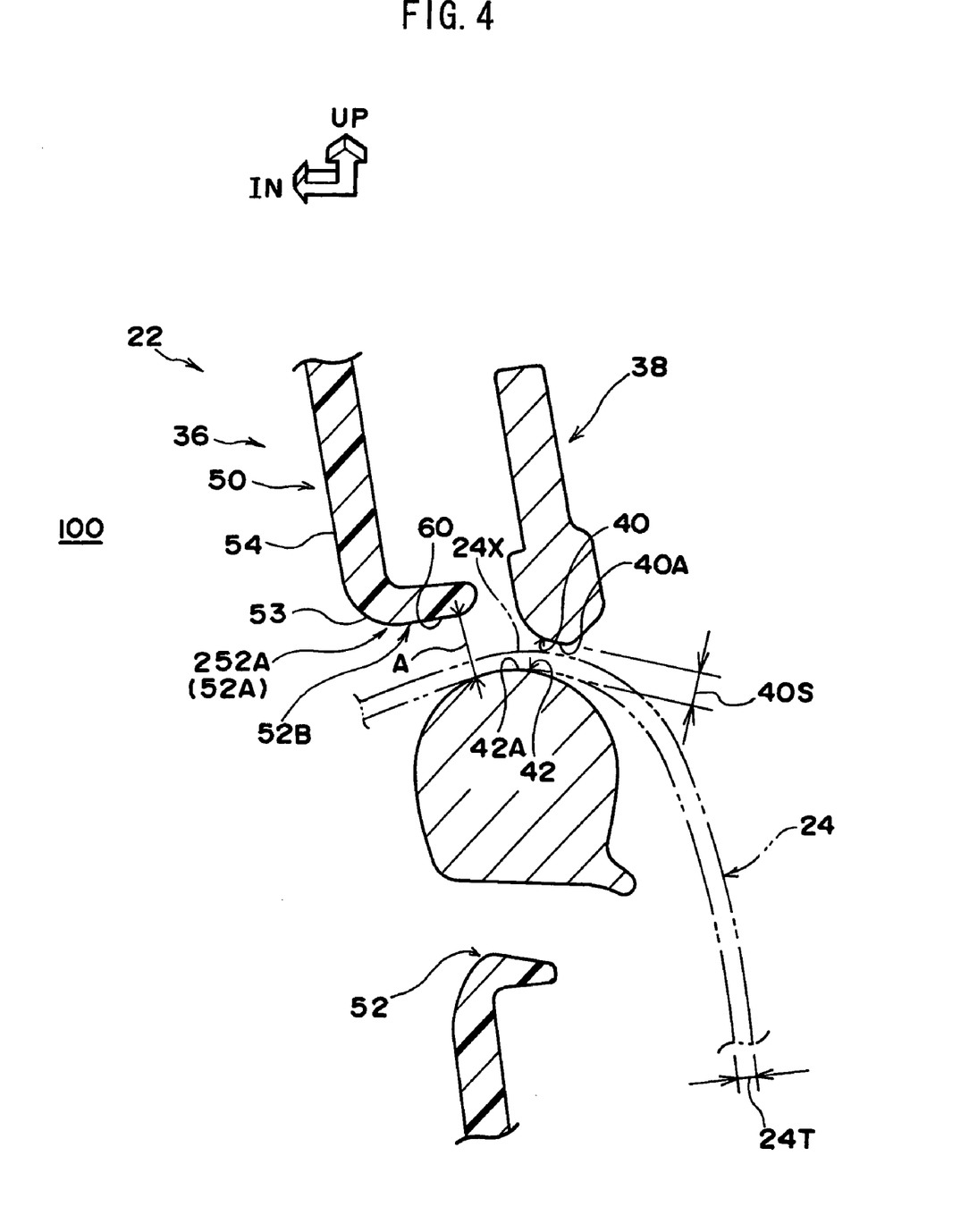
FIG. 4 is a cross-sectional view showing the shoulder anchor device relating to the embodiment of the present invention in a state of being cut at a front portion in the vehicle longitudinal direction (corresponding to the cross-section of line 4-4 of FIG. 5).

As shown in FIG. 2, the opening portion 52 of the slide plate 50 is formed along the locus of rotation of the insert-through hole 40 due to the rotation of the shoulder anchor 38, and is substantially circular-arc-shaped as seen from the vehicle cabin interior 100 side (see FIG. 3). Here, as shown in FIG. 3 and FIG. 4, at the shoulder anchor device 36, a gap 60 between an upper edge portion 52A of the opening portion 52 and the supporting region 42 which supports the webbing 24 at the shoulder anchor 38, is set such that A>B, where A is the gap dimension at the front portion side in the vehicle longitudinal direction and shown in FIG. 4, and B is the gap dimension at the rear portion side in the vehicle longitudinal direction and shown in FIG. 3. (In the drawings, the front portion in the vehicle longitudinal direction at the upper edge portion 52A is denoted by reference numeral 252A, and the rear portion in the vehicle longitudinal direction at the upper edge portion 52A is denoted by reference numeral 152A.)

Note that, in the present exemplary embodiment, the gap dimension A shown in FIG. 4 is set to two times or more the thickness dimension 24T of the webbing 24, and is set to the extent that, in a case in which the webbing 24, which passes through the front portion in the vehicle longitudinal direction of the gap 60, is pulled toward the vehicle front side, the top and bottom surfaces of the webbing 24 are hardly interfered with at all (the path of movement of the webbing 24 is hardly restricted at all). Further, the gap dimension B shown in FIG. 3 is set to a dimension that is substantially equal to the hole gap dimension 40S of the insert-through hole 40 (i.e., a dimension which is slightly larger than the thickness dimension 24T of the webbing 24, and a dimension which is less than two times the thickness dimension 24T of the webbing 24 (the thickness dimension when the webbing 24 is folded-over in the direction of thickness)), and is set such that the path of movement of the webbing 24 is restricted. Moreover, the range, in the vehicle longitudinal direction, over which the gap dimension B is set, or in other words, the range which is the rear portion 152A in the vehicle longitudinal direction at the upper edge portion 52A shown in FIG. 2, can be, for example, a range of 20 mm to 30 mm toward the vehicle front side from the rear end of the upper edge portion 52A.

An upper portion vertical wall 54 of the slide plate 50, which is at the vehicle upper side of the opening portion 52 shown in FIG. 3, is bent toward the vehicle transverse direction outer side at the lower end portion thereof in the vertical direction of the vehicle (this bent portion is denoted by reference numeral 53). Namely, the upper edge portion 52A of the opening portion 52 has an extended guide 52B which serves as an extended portion and is extended toward the vehicle transverse direction outer side which is the direction toward the hole upper edge 40A of the insert-through hole 40. At the rear portion 152A in the vehicle longitudinal direction at the upper edge portion 52A, the bottom surface of the extended guide 52B protrudes toward the bottom side of the vehicle and is a protruding portion 152B.

The rear portion 152A at the upper edge portion 52 including this protruding portion 152B is set at a position which is further toward the vehicle cabin interior 100 side than an uppermost portion position 24X of the webbing 24 which is folded-back by the supporting region 42 at the shoulder anchor 38, i.e., a position further toward the vehicle cabin interior 100 side than the peak portion 42A of the supporting region 42. Further, the protruding portion 152B is set at a position which, as seen in the side section of FIG. 3, is further toward the bottom side of the vehicle than the uppermost portion position 24X of the webbing 24 and the peak portion 42A of the supporting region 42. In this way, the rear portion 152A in the vehicle longitudinal direction at the upper edge portion 52A is set at a position at which, if the webbing 24 is twisted, the rear portion 152A abuts a twisted portion 24Y of the webbing 24 and correction of the twisted portion 24Y is possible.

(Operation/Effects of Embodiment)

The operation and effects of the above-described embodiment will be described next.

As shown in FIG. 2, the shoulder anchor 38 is disposed at the vehicle side portion 22 so as to be able to rotate around the axis of the bolt 48 which runs along the substantially transverse direction of the vehicle, and the insert-through hole 40 is formed in the shoulder anchor 38, and the longitudinal direction intermediate portion of the elongated, belt-shaped webbing 24 is inserted-through the insert-though hole 40 and folded-back and supported. Therefore, at times of taking-up or at times of pulling-out the webbing 24 or the like, the shoulder anchor 38 rotates in accordance with the direction in which the webbing 24 is pulled. Further, the slide plate 50 is disposed at the vehicle side portion 22 so as to be unable to rotate, and covers the vehicle cabin interior 100 (see FIG. 3) side of the shoulder anchor 38, and the opening portion 52, which is for passage of the webbing 24, is formed along the locus of rotation of the insert-through hole 40 due to the rotation of the shoulder anchor 38. Therefore, even if the webbing 24 is pulled and the shoulder anchor 38 rotates, the webbing 24 passes through the opening portion 52 of the slide plate 50 at the side further toward the vehicle cabin interior 100 (see FIG. 3) than the insert-through hole 40 of the shoulder anchor 38.

Figure 5:
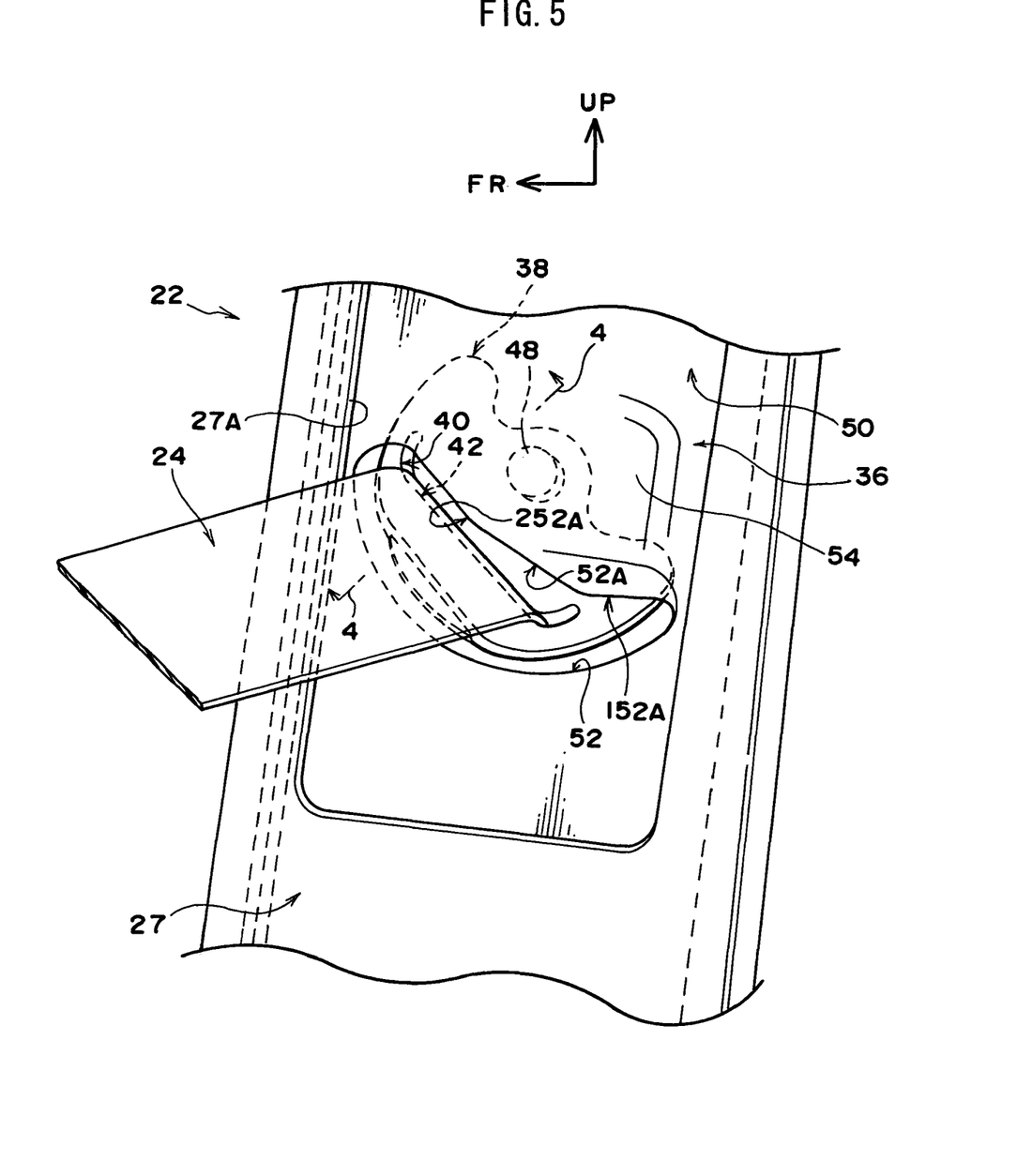
FIG. 5 is a perspective view showing the shoulder anchor device relating to the embodiment of the present invention in a state in which the webbing is pulled-out.

When the webbing 24 is pulled toward the front of the vehicle by the vehicle occupant at the time of pulling-out the webbing 24, as shown in FIG. 5, the shoulder anchor 38 rotates around the axis of the bolt 48 toward the vehicle front side, and the webbing 24 passes through the vehicle longitudinal direction front portion of the opening portion 52. Here, the gap between the upper edge portion 52A of the opening portion 52 and the supporting region 42 which supports the webbing 24 at the shoulder anchor 38, is set such that A>B, where A is the gap dimension at the front portion side in the vehicle longitudinal direction and shown in FIG. 4, and B is the gap dimension at the rear portion side in the vehicle longitudinal direction and shown in FIG. 3. Therefore, as shown in FIG. 5, it is difficult for the webbing 24 at the time of pull-out, which is being pulled toward the vehicle front side, to interfere with the upper edge portion 52A (the front portion 252A) of the opening portion 52, and the webbing 24 is pulled-out smoothly with the movement thereof hardly being impeded at all (the webbing 24 moves in a state in which there is a gap between the webbing 24 and the upper edge portion 52A (the front portion 252A)). Therefore, the pull-out feeling can be made to be good.

Namely, in a structure for comparison in which, for example, the shoulder anchor (slip joint) and the cover are made integral and the cover also rotates synchronously with the rotation of the shoulder anchor, if an extending portion which corrects the twisting of the webbing is provided at the cover, there is the concern that, at the time of pulling-out the webbing, the webbing will interfere with this extending portion and the pull-out feeling will be deteriorated. However, in the shoulder anchor device 36 of the present exemplary embodiment, as described above, a good pull-out feeling can be ensured.

Figure 6:
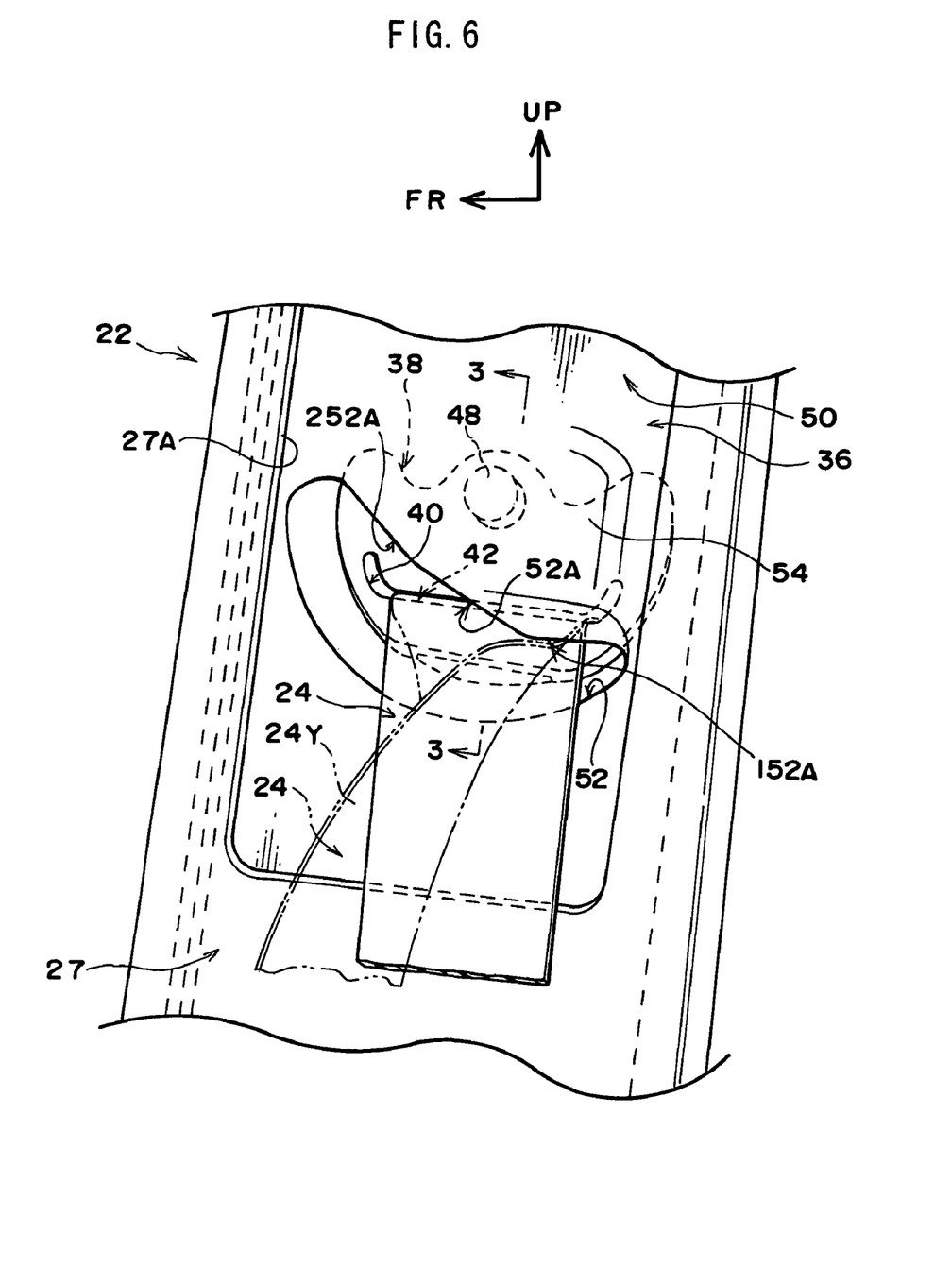
FIG. 6 is a perspective view showing the shoulder anchor device relating to the embodiment of the present invention in a state in which the webbing is taken-up.

When the webbing 24 is pulled toward the bottom side of the vehicle due to operation of the webbing retractor 28 (see FIG. 1) at the time of taking-up the webbing 24 (the time of housing the seat belt), as shown in FIG. 6, the shoulder anchor 38 rotates around the axis of the bolt 48 toward the bottom side of the vehicle (returns to the original position), and the webbing 24 passes through the rear portion in the vehicle longitudinal direction of the opening portion 52. Here, as shown in FIG. 3 and FIG. 6, the rear portion 152A in the vehicle longitudinal direction at the upper edge portion 52A is set at a position such that, when the webbing 24 is twisted, the rear portion 152A abuts the twisted portion 24Y of the webbing 24 and correction of the twisted portion 24Y is possible. Therefore, the webbing 24 at the time of take-up abuts the rear portion 152A at the upper edge portion 52A of the opening portion 52 and the twisted portion 24Y is spread open and corrected, and thereafter, the webbing 24 passes through the insert-through hole 40 and is taken-up.

More specifically, as shown in FIG. 3, the rear portion 152A in the vehicle longitudinal direction at the upper edge portion 52A of the opening portion 52 is set at a position which is further toward the vehicle cabin interior 100 side than the peak portion 42A which is the uppermost region of the supporting region 42 at the shoulder anchor 38. Therefore, at the time of taking-up the webbing 24, before the webbing 24 is folded-back at the peak portion 42A of the shoulder anchor 38, the webbing 24 abuts the rear portion 152A at the upper edge portion 52A of the opening portion 52, and the twisted portion 24Y is spread open and corrected. Thereafter, the webbing 24 is folded-back at the peak portion 42A and passes through the insert-through hole 40 and is taken-up. Further, the upper edge portion 52A of the opening portion 52 has the extended guide 52B that is extended toward the vehicle transverse direction outer side. At the rear portion 152A in the vehicle longitudinal direction at the upper edge portion 52A, the bottom surface of the extended guide 52B protrudes toward the bottom side of the vehicle. Therefore, at the time of taking-up the webbing 24, the webbing 24 is guided to the insert-through hole 40 while the twisted portion 24Y is corrected by the extended guide 52B.

To supplement the above description, in a comparison structure which is such that, at the time of taking-up the webbing (the time of housing the seat belt), the webbing is twisted with the insert-through hole of the shoulder anchor (the slip joint) being the starting point and gets caught as is in the insert-through hole of the shoulder anchor, taking-up of the webbing (housing of the seat belt) becomes impossible. In particular, in such a comparison structure, if, in order to prevent slack of the webbing and the like at the time of application, the insert-through hole of the shoulder anchor is set further toward the vehicle transverse direction outer side than the peak portion which is the uppermost region of the supporting region which supports the webbing at the shoulder anchor, it is difficult to correct the webbing which has been reversed once at the time of taking-up the webbing. Further, generally, the front end and the rear end of the insert-through hole of the shoulder anchor are bent toward the shoulder anchor upper side and the vertical direction gap dimensions thereof are large. Therefore, if the webbing moves near toward the rear end side of the insert-through hole at the time of taking-up the webbing, it becomes easier for the webbing to be twisted, and it is easy for the webbing to get caught in the insert-through hole. However, in the shoulder anchor device 36 of the present embodiment, as described above, the twisted portion 24Y of the webbing 24 is corrected before the webbing 24 reaches the insert-through hole 40 and at the near side of the peak portion 42A of the supporting region 42 at the shoulder anchor 38. Therefore, the webbing 24 getting caught in the insert-through hole 40 can be effectively prevented or suppressed.

Note that, in another comparison structure in which the shoulder anchor (slip joint) and the cover are made integral, and the cover also rotates synchronously with the rotation of the shoulder anchor, and an extending portion which corrects the twisting of the webbing is provided at the cover, the length of the extending portion must be limited in order to avoid a deterioration in the pull-out feeling and slack of the webbing at the time of application, and there is the concern that, due thereto, the correction of the twisting of the webbing will be insufficient. However, in the shoulder anchor device 36 of the present embodiment, there is no such problem because there is a structure (a webbing take-out opening portion structure) in which the dimension of the gap between the upper edge portion 52A of the opening portion 52 at the slide plate 50 and the supporting region 42 which supports the webbing 24 at the shoulder anchor 38, changes.

By the way, in the above-described other comparison structure, in a case in which the extending portion is structured by an elastic body, if the flexibility of the extending portion is set to be high, in addition to the effect of preventing twisting of the webbing being reduced, it can be thought that the concern will arise that the extending portion will get dragged into the insert-through hole at the time of taking-up the webbing. Further, conversely, if the flexibility of the extending portion is set to be low, in addition to the problems of deterioration in the pull-out feeling and slack of the webbing at the time of application, it can be thought that, if used over a long period of time, the webbing will become worn due to interference between the extending portion and the webbing, and it will be easy for fraying to arise. In contrast, in the shoulder anchor device 36 of the present embodiment, such concerns are eliminated due to the above-described predetermined settings.

Further, in the shoulder anchor device 36 of the present embodiment, at the time when the webbing 24 is applied, the webbing 24 extends diagonally toward the front and bottom side of the vehicle (in other words, in an intermediate direction between the direction in which the webbing is pulled at the time of pulling-out and the direction in which the webbing is pulled at the time of taking-up). Therefore, there is little interference with the rear portion 152A at the upper edge portion 52A of the opening portion 52.

As described above, in accordance with the shoulder anchor device 36 relating to the present embodiment, at the time of taking-up the webbing 24, twisting of the webbing 24, which passes through the insert-through hole 40 of the shoulder anchor 38, can be prevented or suppressed before the twisting of the webbing 24 becomes great, and the pulling-out of the webbing 24 can be made to be smooth.

(Supplementary Description of the Embodiment)

Note that, in the above-described embodiment, the slide plate 50, which serves as the cover member and at which the opening portion 52 shown in FIG. 2 is formed, is movable in the vertical direction of the vehicle. However, the cover member in which the opening portion is formed may be another cover member which is fixed to a vehicle side portion such as a pillar garnish or the like for example.

Further, in the above-described embodiment, as shown in FIG. 3, the upper edge portion 52A of the opening portion 52 at the slide plate 50 is provided with the extended guide 52B which is extended toward the vehicle transverse direction outer side. However, the upper edge portion of the opening portion at the cover member may be a shape which is not provided with the extended portion which is extended toward the vehicle transverse direction outer side. Or, the cover member may be a cover member in which the vehicle longitudinal direction rear portion at the upper edge portion, which is not provided with an extended portion, is set at a position at which, when the webbing is twisted, it abuts the twisted portion of the webbing and correction of the twisted portion is possible.

Moreover, in the above-described embodiment, at the slide plate 50, the entire extended guide 52B at the rear portion 152A of the upper edge portion 52A of the opening portion 52 is set at a position which is further toward the vehicle cabin interior 100 side than the peak portion 42A of the supporting region 42. However, the cover member may be a structure in which, for example, at the rear portion of the upper edge portion of the opening portion, only the vehicle cabin interior side end portion of the extended portion is set at a position which is further toward the vehicle cabin interior side than the peak portion of the supporting region.

Still further, in the above-described embodiment, the rear portion 152A in the vehicle longitudinal direction at the upper edge portion 52A of the opening portion 52 of the slide plate 50 is set at a position which is further toward the vehicle cabin interior 100 side than the peak portion 42A which is the uppermost region of the supporting region 42 at the shoulder anchor 38, and such a structure is preferable. However, the rear portion in the vehicle longitudinal direction at the upper edge portion of the opening portion may be set, for example, at a position which is at the vehicle upper side of the peak portion which is the uppermost region of the supporting region at the shoulder anchor, or at a position which is slightly more toward the vehicle transverse direction outer side (the vehicle cabin exterior side) than that peak portion.

Note that, in the above-described embodiment, the opening portion 52 of the slide plate 50 is formed in a substantial circular-arc-shape which comes down toward the bottom side of the vehicle approximately toward the rear side of the vehicle, as seen from the vehicle cabin interior 100 side and as shown in FIG. 2. However, the opening portion of the cover member may be formed, for example, in a substantial U-shape as seen from the vehicle cabin interior side.

Industrial Applicability

The shoulder anchor device of the present invention can be applied broadly to a seat belt device disposed within a vehicle cabin and the like, as a shoulder anchor device through which the intermediate portion of a webbing is inserted and which supports the intermediate portion of the webbing.

The invention claimed is:

1. A shoulder anchor device comprising:
 a shoulder anchor disposed at a vehicle side portion so as to be able to rotate around an axis that runs substantially along a vehicle transverse direction, and in which an insert-through hole is formed, a longitudinal direction intermediate portion of an elongated, belt-shaped webbing being inserted-through the insert-through hole and folded-back and supported; and
 a cover member disposed at the vehicle side portion so as to be unable to rotate, and covering a vehicle cabin interior side of the shoulder anchor, an opening portion for passage of the webbing being formed in the cover member along a locus of rotation of the insert-through hole due to rotation of the shoulder anchor,
 wherein a gap between an upper edge portion of the opening portion and a supporting region that supports the webbing at the shoulder anchor, is such that A>B, where that A is a gap dimension of a front portion side in a vehicle longitudinal direction and B is a gap dimension of a rear portion side,
 the upper edge portion of the opening portion is provided with an extended portion which is extended toward a vehicle transverse direction outer side, and, at the rear portion in the vehicle longitudinal direction at the upper edge portion, a bottom surface of the extended portion protrudes toward a vehicle bottom side.

2. The shoulder anchor device of claim 1, wherein the rear portion in the vehicle longitudinal direction at the upper edge portion of the opening portion is set so as to be positioned further toward a vehicle cabin interior side than a peak portion which is an uppermost region of the supporting region at the shoulder anchor.

3. The shoulder anchor device of claim 1, wherein the gap dimension B of the rear portion side is less than twice a thickness of the webbing.

4. A shoulder anchor device comprising:
 a shoulder anchor provided at a vehicle side portion so as to be able to rotate around an axis that runs substantially along a vehicle transverse direction, and in which is formed an insert-through hole through which an elongated, belt-shaped webbing is inserted, and which has a supporting region at which the webbing is folded-back and supported; and
 a cover member fixed to the vehicle side portion and covering a vehicle cabin interior side of the shoulder anchor, an opening portion through which the webbing is inserted being formed in the cover member, wherein the opening portion has an upper edge portion, and the upper edge portion is formed such that a gap between the upper edge portion and the supporting region at a front portion side in a vehicle longitudinal direction is greater than the gap at a rear portion side in the vehicle longitudinal direction, wherein the upper edge portion is provided with an extended portion which is extended toward a vehicle transverse direction outer side, and a bottom surface of the extended portion protrudes toward a vehicle bottom side, at a rear portion side in the vehicle longitudinal direction.

5. The shoulder anchor device of claim 4, wherein the upper edge portion is formed so as to abut a twisted portion of the webbing at a rear portion side in the vehicle longitudinal direction of the webbing, in a case in which the webbing is twisted at a time of rewinding the webbing.

6. The shoulder anchor device of claim 4, wherein the gap at the front portion side in the vehicle longitudinal direction includes a region where at least a front end portion in the vehicle longitudinal direction of the webbing passes at a time of pulling-out the webbing, and the gap at the rear portion side in the vehicle longitudinal direction includes a region where at least a rear end portion in the vehicle longitudinal direction of the webbing passes at a time of rewinding the webbing.

7. The shoulder anchor device of claim 4, wherein a rear portion in the vehicle longitudinal direction of the upper edge portion is positioned further toward a vehicle cabin interior side than an uppermost region of the supporting region.

8. The shoulder anchor device of claim 4, wherein the gap, at a position where a rear portion side in the vehicle longitudinal direction of the webbing passes, is less than twice a thickness of the webbing.

* * * * *